United States Patent

[11] 3,557,337

| [72] | Inventors | John M. Sipos<br>Easton, Pa.;<br>Donald B. Daniels, Blackwood, N.J. |
|---|---|---|
| [21] | Appl. No. | 803,026 |
| [22] | Filed | Feb. 27, 1969 |
| [45] | Patented | Jan. 19, 1971 |
| [73] | Assignee | Air Products and Chemicals Inc.<br>Allentown, Pa.<br>a corporation of Delaware |

[54] WELDING TORCH
3 Claims, 3 Drawing Figs.

[52] U.S. Cl. .................................................. 219/75,
219/74, 219/130
[51] Int. Cl. ............................................. B65d 9/02,
B23k 9/00
[50] Field of Search .......................................... 219/74,
130, 75, 121, 121P, 136

[56] References Cited
UNITED STATES PATENTS

| 2,510,205 | 6/1950 | Baird | 219/130 |
| 3,249,734 | 5/1966 | Meyer | 219/130 |
| 3,496,328 | 2/1970 | Moerke | 219/130 |

*Primary Examiner*—A. Bartis
*Assistant Examiner*—L. H. Bender
*Attorneys*—Ronald B. Sherer and B. Max Klevit

ABSTRACT: A welding torch of the tungsten electrode and inert gas type having a gas hose which is separate from the power cable, each being separately secured to a connector within the handle portion of the torch. Either the gas hose or the power cable is thus individually replaceable to thereby minimize maintenance costs.

INVENTORS
DONALD B. DANIELS
JOHN M. SIPOS

BY *Ronald B. Shiver*

ATTORNEY 3,557,337

WELDING TORCH

BACKGROUND OF THE INVENTION

This invention relates to the field of welding torches of the tungsten electrode and inert gas type known in the art and referred to hereinafter as a "TIG" torch.

TIG torches are well-known in the art and are conventionally provided with a torch head at one end having a barrel member containing a collet to hold the electrode in position. Shielding gas is delivered to the barrel member and passes therethrough for discharge into a nozzle.

The prior art TIG torches are also provided with a valve for controlling the flow of the shielding gas to the barrel and means for connecting the torch to a supply for the shielding gas as well as a supply of electric power. It is desirable to construct the shielding gas and power supply connections so as to minimize the cost and maintenance of the welding torch while also achieving an effective shielding gas flow and a good electrical conductive path between the power source and the welding electrode.

For example, in the use of prior art torches the shielding gas and the power cable are generally arranged with the power cable extending within a conduit for the shielding gas. This arrangement is unsatisfactory in may applications wherein the torch must be used in areas where there are very low temperatures such as a subzero temperature. The problem is that the choice of a proper material for the shielding gas conduit which can withstand the high temperatures produced during welding is quite unsatisfactory because it becomes too stiff at low temperatures thereby resulting in cracking or difficulty in use.

Another problem with the prior art torches in general use today is that if the gas hose becomes damaged, it is necessary to replace the entire assembly comprising the damaged gas hose and the power cable therein whereby there are excessive maintenance costs.

SUMMARY OF THE INVENTION

There is provided in accordance with the invention an improved arrangement for connecting the source of shielding gas and the electrical power cable to the torch head. In accordance with the invention there is provided a connector which is mounted in the handle of the torch and receives a shielding gas fitting at one location and the electrical power cable at another location spaced therefrom. By reason of this arrangement involving a gas hose separate from the electrical power cable, there is provided better heat dissipation from the power cable and more suitable materials can be used for the gas hose which materials can withstand lower temperature conditions without losing their flexibility. Moreover, maintenance costs are reduced since replacement of either the gas hose or the power cable is less expensive than replacing the combination gas hose and power cable assembly of the prior art torches currently in use.

DESCRIPTION OF THE PREFERRED EMBODIMENT

Figure 1:
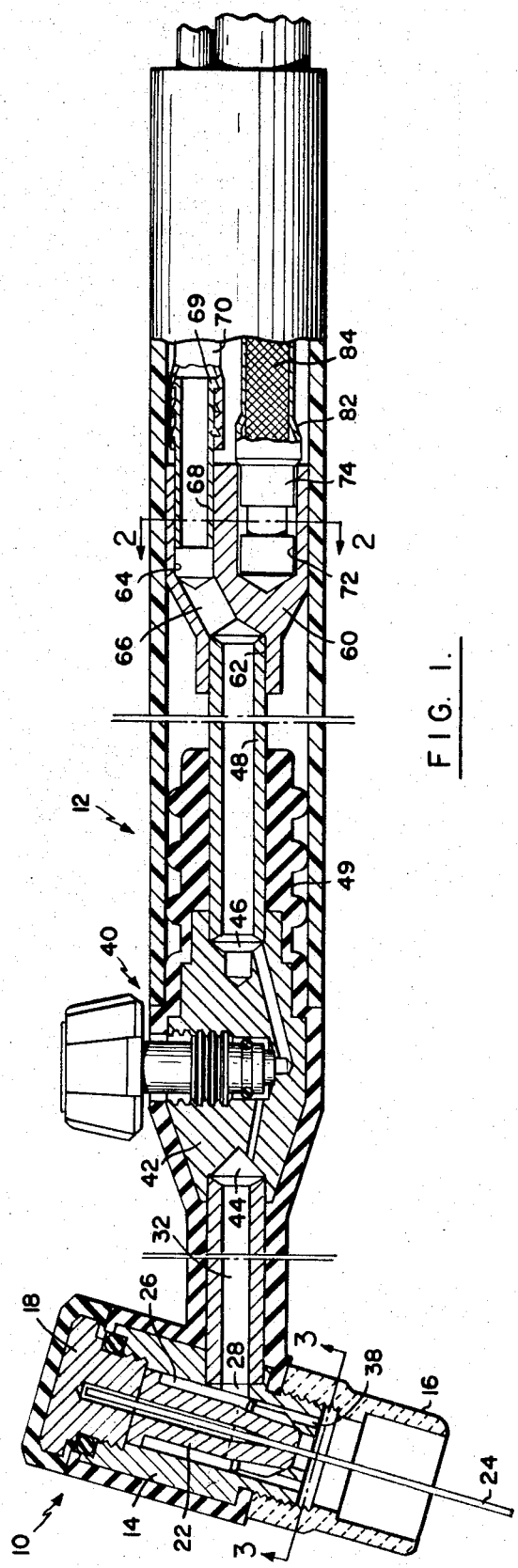
FIG. 1 is an enlarged longitudinal section of a TIG torch in accordance with the present invention.
Figure 3:
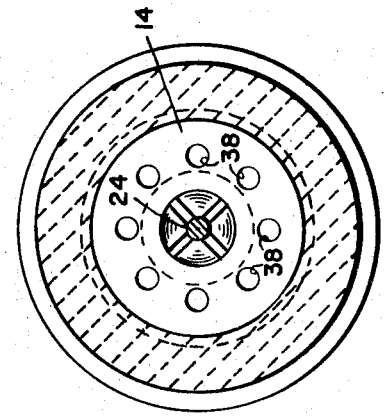
FIG. 3 is an enlarged sectional view taken on line 3–3 of FIG. 1.

The welding torch in accordance with the invention comprises a torch head which is indicated generally at 10 and is joined with a handle portion indicated generally at 12. The torch head 10 includes a barrel member 14, a ceramic nozzle 16, a cap 18, threadedly connected to the barrel member 14, and a collet 22 positioned within the barrel member 14. The torch head 10 is the subject matter of copending application Ser. No. 800,084, filed on Feb. 18, 1969.

As is described more fully in said copending application, the collet 22 serves to grip the tungsten electrode indicated at 24 and hold the same in a desired position for welding. An annular chamber 26 is formed between the collet 22 and the barrel member 14, there being provided a side port 28 communicating with this annular chamber 26 and a counterbore which receives and is rigidly connected to a gas and current supply tube 32. Shielding gas is delivered from the annular chamber 26 to the interior of the nozzle 16 by way of a plurality of circumferentially spaced ports 38 formed in the barrel member 14.

The shielding gas is supplied to the tube 32 by way of a control valve indicated generally at 40. This control valve is the subject matter of copending application Ser. No. 800,083, filed Feb. 18, 1969. The control valve 40 comprises a valve body 42 provided with an outlet port 44 in communication with the tube 32 and an inlet port 46 which is adapted to receive a gas and current supply tube 48. As is described more fully in said copending application Ser. No. 800,083, the control valve 40 comprises a one-piece stem to control flow between the inlet port 46 and the outlet port 44, by way of suitable passages and a valve seat.

It is noted that the control valve 40 is contained within the molded insulation material 49 and is mounted within the cylindrical handle 12 by means of a plurality of ridges formed on an extension of the insulation material 49, the ridges frictionally contacting the cylindrical handle portion 12 as is shown in FIG. 1.

There is also contained within the cylindrical handle 12, at a spaced location from the control valve 40 the means in accordance with the invention for connecting the gas and current supply tube 48 to a supply of shielding gas and a power supply cable. Such means comprises a generally cylindrical connector 60 mounted within the handle 12. At one end, the connector 60 is provided with a central bore 62 into which the end of the supply tube 48 is secured.

The connector 60 is provided with a second bore 64 which is offset with respect to central bore 62 and which extends axially inwardly from the end thereof opposite bore 62. The inner end of the bore 64 is connected to the bore 62 by means of an angled passageway 66. Mounted within the bore 64 is tubular hose fitting 68, having an extending end 69 which is arranged to receive at its outer wall a flexible hose 70 which leads to a source of suitable shielding gas. The extending end 69 of the hose fitting 68 is provided with annular ridges on barbs which serve to securely engage the inner wall of the flexible hose 70 as is best shown in FIG. 1. If desired, a clamping ring may be placed over the hose 70 in the region of the end 69. The hose 70 is made of "nylon" or other suitable flexible material.

Figure 2:
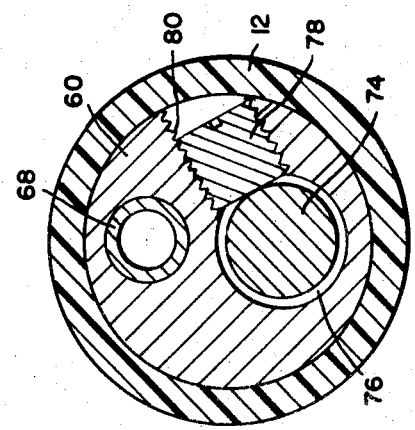
FIG. 2 is an enlarged sectional view taken on line 2–2 of FIG. 1.

The connector 60 is provided with a second offset and axially extending bore 72. Extending within the bore 72 is a cable connector plug 74 which has a solid cylindrical portion positioned within the bore 72 and provided with an undercut portion 76. The plug 74 is secured within the bore 72 by means of a set screw 78 which is threadedly engaged in a threaded bore 80 extending at an angle to a radius of the cylindrical connector 60 as is best shown in FIG. 2. This angular arrangement results in a longer threaded bore 80 which is strong and can accommodate a larger set screw. The set screw 78 engages the plug 74 within the undercut portion 76 thereof and is tightened to lock and frictionally hold the plug 74 in the connector 60. The set screw 78 is contained completely within the bore 80. The portion 82 of the plug 74 extending outwardly of the gore 72 is in the form of a hollow tube and is connected to an electrical power cable 84 by a conventional crimping operation involving the positioning of the end of the cable 84 within the tube 82 followed by the inward crimping of the tube 82 to form a tight electrical and mechanical connection.

In the operation of the welding torch in accordance with the invention, the welding current will be conveyed to the electrode from the supply cable 84 by way of the cable connector 74, the connector 60, the tube 48, the valve body 42, the tube 32, the barrel member 14 and the collet 22. The gas is supplied through a similar path from the supply hose 70, through the hose fitting 68 and through the connector 60 by way of the passages 64, 66 and 62 and into the conduit 48. The gas then passes through the conduit 48 and the inlet portion 46 in the valve body 42 through the valve passages and past the valve seat into the outlet port 44 and into the tube 32. The gas then passes through the tube 32 and is discharged through side port 28 into the annular chamber 26 in the barrel member 14 of the torch head 10. The gas will be distributed around the annular chamber 26 and flow downwardly through the eight circumferentially spaced passages 38 and be discharged into the nozzle at locations surrounding the electrode 24. It will be apparent that by this arrangement the gas flow will be smooth and even to provide an even envelope of shielding gas surrounding the electrode and the weld puddle during the welding operation.

Furthermore, there is provided an improved means for connecting the gas supply and the electrical supply to the head of the torch in the form of a connector which is effectively connected to a separate electrical cable and gas supply hose means. The construction is such that effective head dissipation is provided for both the electrical cable and a more flexible temperature insensitive material may be used for the gas hose. Moreover, this construction permits ease of maintenance and reduces maintenance costs since only the damaged gas hose or power cable need be replaced instead of both.

It is to be understood that the above description is illustrative and it will be apparent that various changes may be made in the construction and arrangement of parts without departing from the scope of the invention. Accordingly, it is not desired to be limited except as required by the following claims.

We claim:

1. A welding torch comprising a handle, a torch head mounted on said handle, and means carried by said handle for delivering shielding gas and welding current to said torch head, said last-named means comprising a conduit means extending through said handle to the torch head, a flexible hose means for the shielding gas, an electrical power cable for supplying the welding current, means for connecting said conduit means with said flexible hose and said electrical power cable including a connector mounted within said handle, one end of said connector having an axially extending bore securely receiving the end of said conduit means, the other end of said connector having a second axially extending bore and a third axially extending bore extending inwardly from said other end thereof, a tubular hose fitting having one end secured within said second bore and extending outwardly from said connector for connection to said flexible hose for the delivery of gas into the interior of said second bore, an internal passage within said connector interconnecting said second bore and said first bore for providing communication for the flow of gas therebetween, an electrical plug member positioned within said third bore and having an extended portion adapted to be electrically connected to said power cable and means for locking said electrical plug member within said third bore.

2. A welding torch according to claim 1 wherein said first bore is aligned with the longitudinal axis of said connector, and said second and third bores are spaced radially relative to said axis of said connector.

3. A welding torch according to claim 2 wherein the portion of said electrical plug member extending within said cylindrical bore is generally cylindrical and has a recessed portion, a bore extending from the external cylindrical wall of said connector at an angle relative to a radius of said connector into said third bore, said last-named bore being threaded, and a set screw threadedly received and contained within said last-named bore and engaging said electrical plug member at said recessed portion for locking the same with said connector.

PO-1050
(5/69)

UNITED STATES PATENT OFFICE
CERTIFICATE OF CORRECTION

Patent No. 3,557,337        Dated January 19, 1971

Inventor(s) John M. Sipos and Donald B. Daniels

It is certified that error appears in the above-identified patent and that said Letters Patent are hereby corrected as shown below:

Column 1, line 26 -- "may" should read ---many---

Column 2, line 20 -- after "one-piece" insert the following ---valve member which functions as a combined valve head and valve---

Column 2, line 60 -- "strong" should read ---stronger---

Column 2, line 66 -- "gore" should read ---bore---

Column 3, line 4 -- "portion" should read ---port---

Signed and sealed this 11th day of May 1971.

(SEAL)
Attest:

EDWARD M. FLETCHER, JR.
Attesting Officer

WILLIAM E. SCHUYLER, J
Commissioner of Patent